(12) United States Patent
Squillante et al.

(10) Patent No.: US 12,469,242 B2
(45) Date of Patent: Nov. 11, 2025

(54) END USER SELECTABLE/VARIABLE OBJECT DETECT ILLUMINATION

(71) Applicant: ZEBRA TECHNOLOGIES CORPORATION, Lincolnshire, IL (US)

(72) Inventors: Gennaro Squillante, Centereach, NY (US); Mark D. Anderson, Dix Hills, NY (US); Michael P. Steele, Wantagh, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 425 days.

(21) Appl. No.: 17/955,911

(22) Filed: Sep. 29, 2022

(65) Prior Publication Data

US 2024/0112433 A1  Apr. 4, 2024

(51) Int. Cl.
*G06V 10/145* (2022.01)
*G06K 7/14* (2006.01)
*G06V 10/141* (2022.01)

(52) U.S. Cl.
CPC ......... *G06V 10/145* (2022.01); *G06K 7/1443* (2013.01); *G06V 10/141* (2022.01)

(58) Field of Classification Search
CPC .. G06K 7/1443; G06K 7/10732; G06K 7/146; G06K 7/1404; G06K 7/1439; G06K 7/1447; G06K 7/10831; G06K 7/10881; G06K 7/1091; G06K 7/1096; G06K 7/10693; G06V 10/141; G06V 10/145; G06V 10/17; H03M 1/002; H04N 19/156;
(Continued)

(56) References Cited

U.S. PATENT DOCUMENTS 6,478,225 B1 * 11/2002 Swartz ............... G06K 7/10861
235/462.25
9,232,215 B1 *  1/2016 Watson ................ H04N 17/004
(Continued)

OTHER PUBLICATIONS

International Search Report and Written Opinion for International Application No. PCT/US2023/28234 mailed on Oct. 24, 2023.

*Primary Examiner* — Matthew C Bella
*Assistant Examiner* — Nicholas John Helco
(74) *Attorney, Agent, or Firm* — Yuri Astvatsaturov (57) ABSTRACT

Systems and methods for calibrating an adaptive illumination system of an imager are presented. An example method includes causing the system to enter a calibration mode and providing a calibration illumination level from an illumination source to an environment. An imager captures one or more images of the environment. A processor determines, from the one or more images, a first illumination intensity to provide during an object detect mode operation of the system. The first illumination intensity has an illumination sufficient for detecting a presence of an object in the environment during the object detect mode. The processor stores the first illumination intensity in a memory, and configures the illumination source to provide illumination at the first illumination intensity while the adaptive illumination system is in the object detect mode, and (ii) provide illumination at a second illumination intensity while the adaptive illumination system is in a scanning mode.

18 Claims, 6 Drawing Sheets

(58) Field of Classification Search
CPC ............... H04N 1/00891; H04N 23/65; H04N 1/00896; H04N 23/651; G06F 9/4418
See application file for complete search history.

(56) References Cited

U.S. PATENT DOCUMENTS

| | | | |
|---|---|---|---|
| 2007/0131850 A1 | 6/2007 | Cofer et al. | |
| 2007/0194124 A1* | 8/2007 | Kotlarsky | G06K 7/10722 235/462.31 |
| 2016/0267305 A1* | 9/2016 | Lei | G06K 7/10584 |
| 2016/0342836 A1* | 11/2016 | Hanna | G06T 7/50 |
| 2016/0350607 A1* | 12/2016 | Sokeila | G06F 1/3231 |
| 2017/0150571 A1* | 5/2017 | Baaijens | H05B 45/20 |
| 2019/0204577 A1* | 7/2019 | Faris | G02B 21/0088 |
| 2021/0150162 A1* | 5/2021 | Barkan | G06K 7/1413 |

\* cited by examiner

END USER SELECTABLE/VARIABLE OBJECT DETECT ILLUMINATION

BACKGROUND

Conventional barcode scanning systems require illumination to capture images of objects to decode barcodes in a captured image frame. To reduce the power required for a scanner, the system may enter a dormant mode between scans when objects are not presented to the scanner. In such a mode an illumination source may be turned off, and additional processing elements may also be set to a sleep or off mode to further reduce energy use. As such, a barcode scanner in a dormant mode must detect the presence of an object to switch into a scanning mode to capture images and decode indicia in the captured images. In most use cases, an illumination source must provide illumination to an object for the scanner to detect the presence of the object. Currently, during object detection dormant modes, illumination sources provide too much light that can cause eye strain and eye annoyance, or the illumination may reflect off of nearby surfaces without the presence of an object, which causes stray light to reflect into other areas of a room. Scanners may be implemented in low-light conditions which further would cause eye irritation due to high amounts of light provided by an illumination source. Reducing the amount of light provided by an illumination source, in low light conditions, may further prevent the system from detecting the presence of an object, causing inefficiencies and system failure to enter a detect mode. A low object detect efficiency results in a system requiring multiple swipes or presentations of an object at various distances and positions to try to cause the system to detect the object and enter a scan mode. This may greatly increase scanning time and cause user frustration during operation of the system.

Accordingly, it is beneficial to further control the illumination provided by a light source for object detection to prevent excess eye irritation, and to conserve system power.

SUMMARY

In an embodiment, the present invention is a method for calibrating an illumination source of an adaptive illumination system of an imager. The method incudes causing the adaptive illumination system to enter a calibration mode in which the illumination source of the adaptive illumination system is prevented from illuminating an environment. An imaging sensor of the imager captures a first image frame data of the environment, and a processor determines from the first image frame data, an object detection illumination intensity level for the illumination source. The object detection illumination intensity level has an illumination intensity sufficient for detecting a presence of an object in the environment in a dormant mode of the adaptive illumination system, and an intensity level less than a scanning illumination intensity level for illuminating the object in the environment during a scanning mode of the adaptive illumination system. The method further includes storing, by the processor, the determined object detection illumination level in a memory, and configuring, by the processor, the illumination source of the adaptive illumination system to (i) provide illumination at the object detection illumination intensity level while the adaptive illumination system is in the dormant mode, and (ii) provide illumination at the scanning illumination intensity level while the adaptive illumination system is in the scanning mode.

In a variation of the current embodiment, causing the system to enter a calibration mode comprises presenting a calibration barcode to the imaging sensor of the adaptive illumination system. In another variation of the current embodiment, the method further comprises determining, by the processor and from the first image frame, a sensor gain value for the imaging sensor. The sensor gain value may be a maximum sensor gain value in embodiments, or the sensor gain value may comprise a range of acceptable sensor gain values. In more variations of the current embodiment, determining the object detect illumination level further comprises determining the object detect illumination level from the sensor gain value.

In further variations of the current embodiment, the method further includes determining, by the processor and from the object detection illumination level, a range of illumination levels; providing, by the illumination source, illumination over the range of illumination levels; capturing, by the imaging sensor, a plurality of image frames at different illumination levels; and determining, by the processor, a minimum and maximum object detect illumination level from the plurality of image frames.

In another embodiment, the present invention is an adaptive illumination device with an adaptive illumination source disposed to provide illumination to an environment. The adaptive illumination source is capable of providing variable intensities of illumination to the environment including providing (i) a calibration illumination level to an environment, the calibration illumination intensity level determined from ambient illumination of the environment, (ii) a first illumination intensity sufficient for illuminating an object in the environment for an imager to detect the object in the environment, and (iii) a second illumination intensity sufficient for performing scanning of indicia associated with the object in the environment.

In yet another embodiment, the present invention is an adaptive illumination imaging system. The adaptive illumination system includes an illumination source disposed to provide illumination to an environment, the illumination source capable of providing variable illumination intensities to the environment; an imaging sensor disposed capture a frame of the environment and to generate an electrical signal indicative of the frame; a processor and computer-readable media storing machine readable instructions that, when executed, cause the adaptive illumination imaging system to: causing the adaptive illumination system to enter a calibration mode in which the illumination source of the adaptive illumination system provides a calibration illumination level to an environment; capture, by the imaging sensor, one or more first frames of the environment; determine, by the processor and from the one or more first frames, a first illumination intensity for the illumination source, the first illumination intensity having an illumination intensity sufficient for detecting a presence of an object in the environment in an object detection mode of the reader, and less intensity than a second illumination intensity for illuminating the object in the environment during a scanning mode of the reader; store, by the processor, the determined first illumination intensity in a memory; and configure, by the processor, the illumination source (i) provide illumination at the first illumination intensity while the adaptive illumination system is in the object detect mode, and (ii) provide illumination at the second illumination intensity while the adaptive illumination system is in the scanning mode.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The disclosed systems and methods enable tuning of an illumination level for performing object presence in a field of view of an imaging system such as a barcode scanner or a point-of-sale (POS) system. As described herein, object detection is performed with low illumination to reduce the amount of energy and power used by the scanner. Once an object has been identified, the scanner enters a read or scan mode that provides more illumination to the field of view to enable scanning of the object, or indicia associated with the object. Systems having fixed object detect illumination levels may provide too much light in low ambient light settings which can cause eye irritation and waster energy. In high ambient light environments, fixed illumination levels may not be high enough for the system to properly detect the object or to operate properly. The ability to automatically, or manually, tune the object detect illumination level allows for a system to operate under various environmental conditions, or changing environmental light conditions such as if lights are dimmed in a room after a certain hour, but a POS system in the environment is still required to scan barcodes at the altered ambient light level. The systems and methods described herein allow for tuning of an object detect illumination level or range for an imaging system which reduces eye annoyance, reduces energy usage, and allows for proper performance of a scanner at various environmental ambient light levels.

Figure 1:
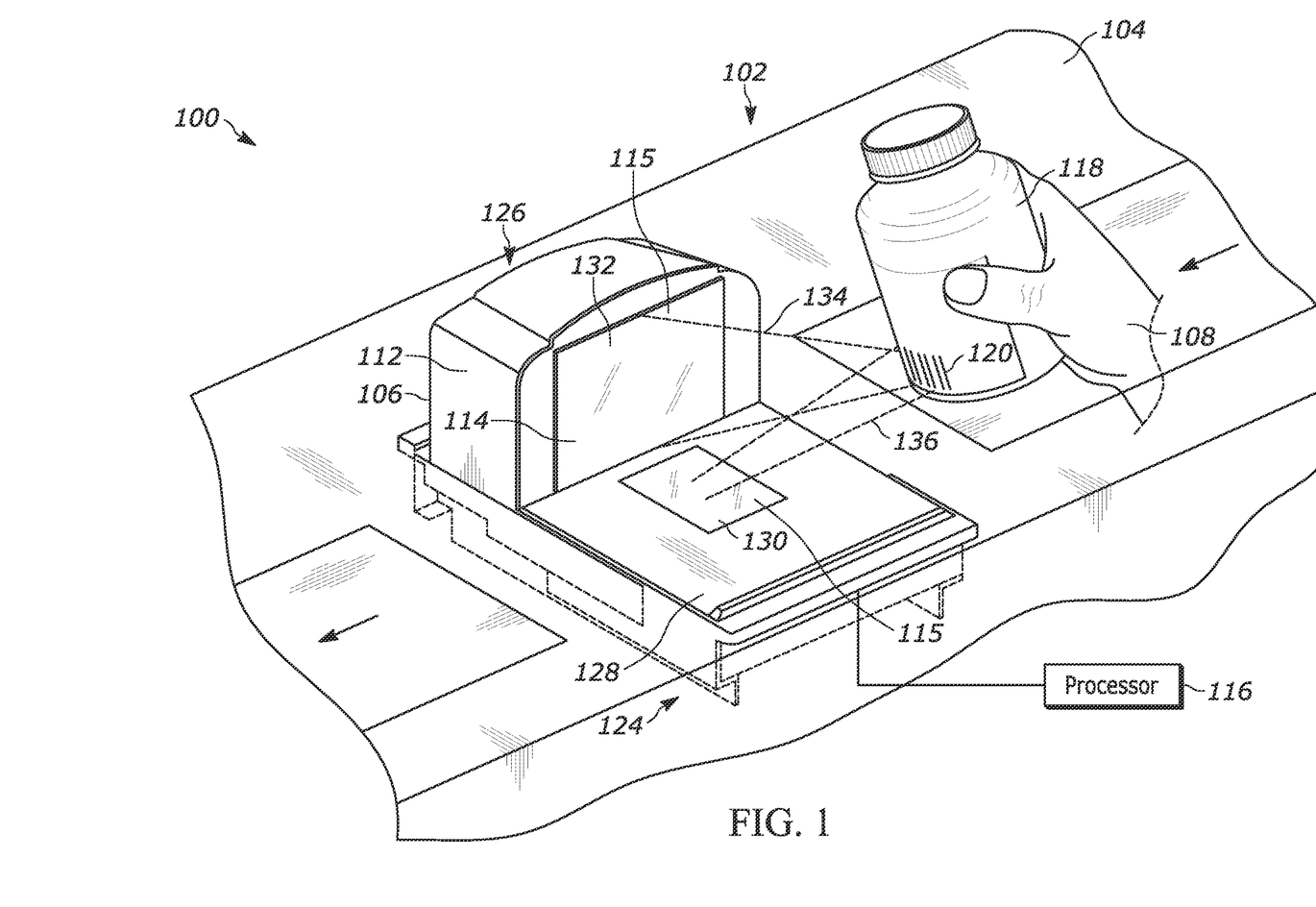
FIG. 1 illustrates a perspective view of an example checkout workstation point-of-sale system in accordance with the teachings of this disclosure.

FIG. 1 illustrates a perspective view of an example point-of-sale (POS) system 100 in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products. The POS system 100 may be in a low-light environment, or a high light environment such as an outdoor venue, which requires different object detect illumination levels to effectively detect an object to enter a scanning and reading mode of the POS system 100.

The barcode reader 106 includes a housing 112 that houses an optical imaging assembly 114. The optical imaging assembly 114 includes one or more image sensors and is communicatively coupled to a processor 116. The image sensors may include one or more color cameras, one or more monochrome imagers, one or more optical character readers, etc. The processor 116 may be disposed within the barcode reader 106 or may be in another location. The optical imaging assembly 114 includes one or more fields of view (FsOV) for detecting an object or objects in the one or more FsOV. Further, the optical imaging assembly 114 is operable to capture one or more images of one or more targets 118 entering and/or being within a field of view (FOV) of the optical imaging assembly 114. While referenced herein as one or more targets 118, a target 118 may also be referred to herein as an object of interest, or in short, an object. In any embodiment or description, the target 118, or object of interest, includes one or more product codes 120 or indicia indicative of information associated with the target 118.

In practice, the targets 118, depicted as a bottle in the example shown, is swiped past the barcode reader 106. While illustrated as a single target in FIG. 1 for simplicity and clarity, it is envisioned that the bottle represents multiple targets 118 to be imaged by the optical imaging assembly 114, and that the multiple targets 118 may be within a field of view of the optical imaging system 114 simultaneously or nearly simultaneously. In doing so, one or more product codes 120 associated with the targets 118 are positioned within the FOV of the optical imaging assembly 114. In the example shown, the product code 120 is a bar code. However, the product code 120 may alternatively be a radio-frequency identification (RFID) tag and/or any other product identifying code. During operation, the POS system 100 may operate in an object detect mode that functions to detect an object in a FOV of the optical imaging system 114. Once an object has been detected in the FOV, the POS system 100 enters a scanning mode that may activate one or more imagers, illumination sources, and processor, or change settings and properties of components of the POS system 100 and optical imaging assembly 114 for capturing the one or more images of the object, and for decoding barcodes or indicia.

In response to capturing the one or more images (e.g., image data), in an example, the processor 116 processes the image data to determine an absence, a presence, movement, etc. of the targets 118 within and/or relative to the FOV. Specifically, the processor 116 processes the image data in real time to determine when one or more of the targets 118 enters the FOV of the optical imaging assembly 114, when one or more targets 118 are within the FOV of the optical imaging assembly 114, and/or when one or more of the targets 118 exits the FOV of the optical imaging assembly 114. The POS system 100 may enter the object detect mode after a certain amount of time has passed after the targets 118 have exited the FOV, with any new targets being presented into an FOV of the POS system 100.

In some examples, the optical imaging assembly 114 has a relatively short focal length that allows the foreground in which the one or more targets 118 may be present to be better isolated from the background, thereby allowing for the targets 118 to be more easily identified and/or tracked within the FOV. In some examples, processing the one or more images allows the processor 116 to identify an object that is moving in the FOV and to identify an object that is not moving in the FOV. The processing may also allow the processor 116 to differentiate between a larger item(s) within the FOV and a smaller item(s) within the FOV, a direction that the targets 118 are moving within the FOV, etc.

After a target 118 has been detected, the POS system 100 enters a scanning mode and the processor performs image processing and decodes the product code 120 associated with the target 118. The processor 116 may be configured to identify the one or more targets 118 based on at least a size of the targets 118, a color of the targets 118, a shape of the targets 118, a feature of the targets 118, a logo displayed on the targets 118, etc. In some examples, identifying the product code 120 includes successfully decoding symbology associated with the targets 118. However, if the targets 118 are detected exiting the FOV and/or entering and exiting the FOV without the product code 120 being identified, the processor 116 may generate an alert indicative of the targets 118 not being scanned. Such an approach may be advantageous in detecting an individual (e.g., the clerk 108) attempting to avoid scanning the targets 118, which may be referred to as the act of "scan avoidance."

After the processor 116 terminates the identification session, in an example, the processor 116 prevents a subsequent identification session from being initiated until one or more targets 118 are detected existing the FOV of the optical imaging assembly 114. An identification session may also be referred to herein as a scanning session or read session. To terminate the identification the processor 116 may cause the POS system 100 to enter an idle session or an object detect session when no targets 118 are present in a FOV of the optical imaging assembly 114. To allow the processor 116 to track the position and/or the movement of the targets 118 within the FOV and/or to identify the targets 118 within the FOV, in some examples, the processor 116 determines a background region that does not contain any objects or product codes 120. The processor may then remove the background region or otherwise filter the background region from image data and may prevent the background region from displaying any image on a user display. Further, the removal of the background region may assist in the system detecting an object while the POS system 100 is in the object detect mode.

The housing 112 includes a lower housing 124 and a raised housing 126. The lower housing 124 may be referred to as a first housing portion and the raised housing 126 may be referred to as a tower or a second housing portion. The lower housing 124 includes a top portion 128 with a first optically transmissive window 130. The first window 130 is positioned within the top portion 128 along a generally horizontal plane relative to the overall configuration and placement of the barcode reader 106. In some embodiments, the top portion 128 may include a removable or a non-removable platter (e.g., a weighing platter). The top portion 128 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 126 is configured to extend above the top portion 128 and includes a second optically transmissive window 132 positioned in a generally upright plane relative to the top portion 128 and/or the first window 130. Note that references to "upright" include, but are not limited to, vertical. Thus, as an example, something that is upright may deviate from a vertical axis/plane by as much as 45 degrees.

The optical imaging assembly 114 includes the image sensor(s) that is configured to detect an object and to digitally read the product code 120 through at least one of the first and second windows 130, 132. In the example shown, the field of view (FOV) includes a first sub-FOV 134 a second sub-FOV 136. In an example, identifying the position of the target 118 through the first and second windows 130, 132 using the optical imaging assembly 114 allows for a virtual three-dimensional (3D) image of the swipe path of the target 118 through the FOV to be identified. The swipe path may include a diagonal swipe path. In addition to monitoring the swipe path, the processor 116 may process the one or more images captured by the optical imaging assembly 114 to track behavior of the clerk 108 including, for example, how the target 118 is held, the swipe direction most followed, etc. Further, the swipe path may be monitored to determine if a given target 118 has already been scanned and/or identified to prevent a re-decoding of a previously decoded product code 120. While the above-example illustrates tracking a single target 118, in other examples, more than one target swipe path may be tracked.

In the examples described herein, the housing 112 further includes one or more adaptive illumination systems 115 disposed in a cavity of the lower housing 124 and/or raised housing 126. The adaptive illumination systems 115 include one or more illumination sources disposed to provide illumination to the one or more FsOV, e.g. the first sub-FOV 134 and/or the second sub-FOV 136. The illumination sources may be configured to provide illumination over an entire FOV, or to a portion of a FOV. The illumination sources may be capable of providing variable illumination intensities depending on a controller of the illumination sources. For example, the processor 116 may directly control an illumination output of the illumination sources, or the processor 116 may provide a signal to a controller (not depicted) to control a current or voltage provided to the illumination source. In examples, the illumination sources may include one or more light emitting diodes, laser diodes, black body radiation sources, or another source capable of providing illumination to a FOV. In the examples described herein, the illumination systems 115 are adaptive illumination systems that can be configured to output different intensities of illumination to one or more FsOV of the optical imaging assembly 114.

Figure 2:
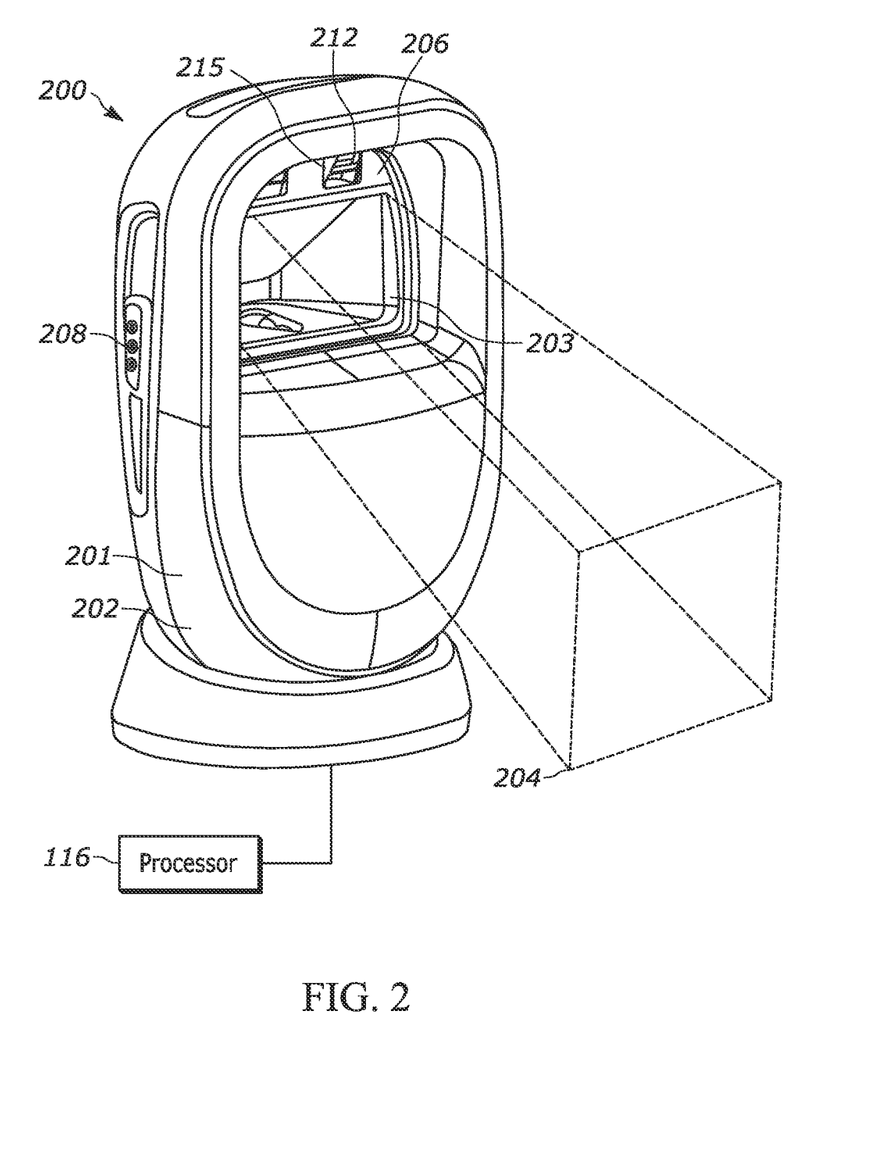
FIG. 2 illustrates an example scanner in accordance with the teachings of this disclosure.

FIG. 2 illustrates a perspective view of an example scanning device 200 in accordance with the teachings of this disclosure. The scanning device 200 may be referred to as an indicia reader. In the example shown, the scanning device 200 includes a housing 201 having a handle or a lower housing portion 202, an optical imaging assembly 203, and an adaptive illumination system 215. The optical imaging assembly 203 is at least partially positioned within the housing 201 and has a FOV 204. The adaptive illumination system 215 is disposed at least partially within the housing 201, with the adaptive illumination system 215 having one or more illumination sources 212 disposed at a position and angle to provide illumination to the FOV 204 of the imaging assembly 203. The scanning device 200 also includes an optically transmissive window 206 and a trigger 208. The optical imaging assembly 203 may include one or more image sensors that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor(s) of the optical imaging assembly 203 may have an imaging axis that extends through the window 206.

The adaptive illumination system 215 may be a stand-alone adaptive illumination device that is removable from the scanning device 200. The adaptive illumination system 215 may operate as a device independent of the scanning device 200. In such examples, the adaptive illumination system 215 may be configured to provide illumination to an environment having n OFV of an imager. The one or more illumination sources 212 include one or more adaptive illumination sources for providing variable intensities of illumination to the environment. The adaptive illumination system 215 further is capable of providing (i) a calibration illumination level to the environment, the calibration illumination intensity level determined from ambient illumination of the environment, (ii) a first illumination intensity sufficient for illuminating an object in the environment for an imager to detect the object in the environment, and (iii) a second illumination intensity sufficient for performing scanning of indicia associated with the object in the environment.

To operate the scanning device 200, a user may engage the trigger 208 causing the scanning device 200 to capture an image of a target, a product code, or another object. Alternatively, in some examples, the scanning device 200 may be activated in a presentation configuration to capture an image of the target, the barcode, or the other object. In the presentation configuration, the scanning device may be configured to be in an object detect mode, or a read mode. In the object detect mode, the illumination system 215 is configured to output an object detect illumination intensity. The processor 116 is configured to process one or more images captured by the optical imaging assembly 203 under the object detect illumination intensity to determine if an object or target is present in the FOV 204 of the optical imaging assembly 203. If the processor determines the presence of an object in the FOV 204, the processor 116 then causes the scanning device to enter the read mode to capture one or more images of the object for decoding. In the read mode, the illumination intensity of the adaptive illumination system 215 is increased or decreased to provide illumination to the object to allow for efficient decoding and/or a desired resolution of indicia in a captured image. The processor then processes the one or more images captured by the optical imaging assembly 203 to identify and decode indicia in the image. The processor then may terminate the identification session and cause the scanning device to leave the read mode and enter the object detect mode in response to a lack of targets in the FOV 404.

Figure 3:
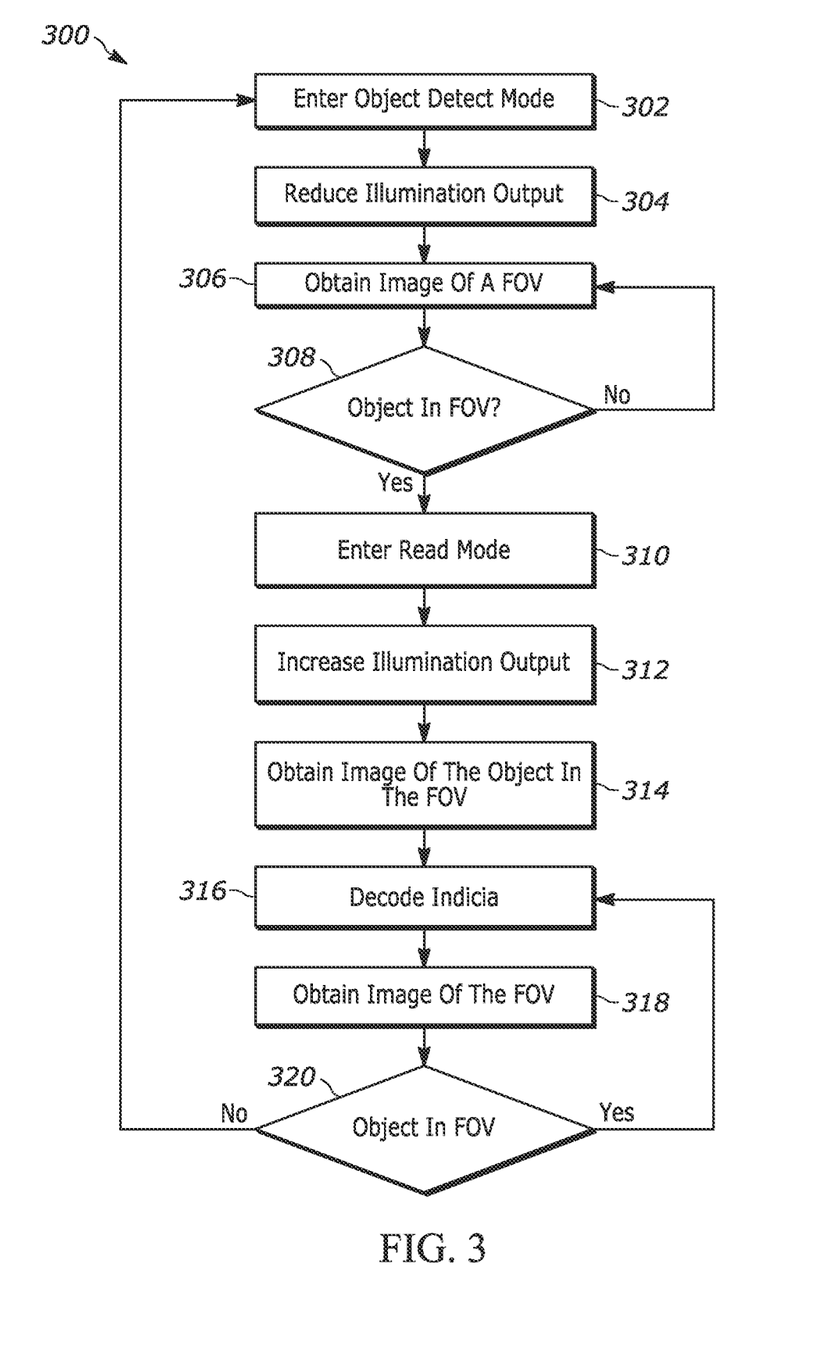
FIG. 3 illustrates a flowchart for performing a method of providing adaptive illumination for performing object detect and reading indicia of a target.

FIG. 3 is a flowchart for performing a method of providing adaptive illumination for performing object detect and reading indicia of a target, as implemented by the barcode reader 106 of FIG. 1 and/or the scanning device 200 of FIG. 2. While described herein for clarity and simplicity in reference to elements of the scanning device 200 of FIG. 2, it should be understood that similar elements and components of the system of FIG. 1, or another imaging system, may also implement the described methods. A process 300 begins at block 302 with an adaptive illumination system entering an object detect mode. To enter the object detect mode, the processor 116 sends the adaptive illumination system 215 a signal to cause the adaptive illumination system to output illumination at an object detect illumination intensity. In examples, the object detect illumination intensity may be at a light intensity that is low enough to prevent irritation to eyes of users or customers using the barcode reader 106 or scanning device 200. As such, the illumination system reduces the illumination output intensity to an object detect intensity (block 304). While described herein as reducing the illumination intensity, in certain environments or implementations, the illumination system may increase the illumination intensity to output illumination at the target object detection illumination intensity.

The imaging sensor of the imager, such as the optical imaging assembly 203, then captures one or more images of a FOV of the scanning device 200. (block 306). The processor 116 performs processing on the image and determines, from the image, if an object is in the FOV of the imager. (block 308). If it is determined that there is no object in the FOV, the process 300 returns to block 306 and obtains another image of the FOV of the imager. If the processor 116 determines that an object is in the FOV of the imager, then the scanning device 200 enters a read mode, or scanning mode. (block 310). The processor 116 sends the adaptive illumination system 215 a signal to cause the adaptive illumination system to output illumination at a scanning illumination intensity level with the scanning illumination intensity being at a greater illumination intensity than the object detect illumination intensity. (block 312). For some applications, the scanning illumination intensity may be less than the intensity of the object detect illumination intensity.

The imaging sensor of the imager then obtains one or more images of the FOV of the scanning device 200. (block 314). The processor 116 identifies indicia in the obtained image, and the processor 116 decodes the indicia to obtain information indicative of one or more properties or characteristics of the object in the FOV. (block 316). The imager then obtains another image of the FOV at block 318, and the processor 116 determines if there is an object in the FOV. (block 320). If the processor 116 determines that there is an object in the FOV then the process 300 returns to block 316 and the processor identifies and decodes indicia in the image. Otherwise, if the processor 116 determines that there is no object in the FOV, the process 300 returns to block 302 and the scanning device 200 enters the object detect mode.

Figure 4:
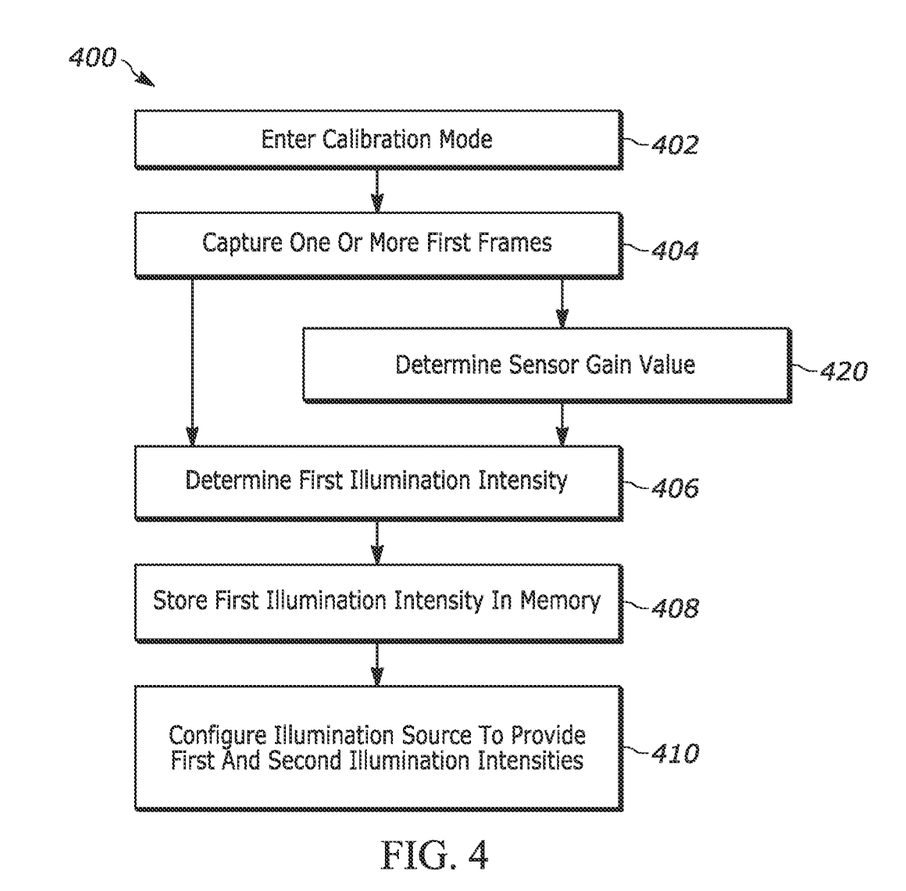
FIG. 4 illustrates a flowchart for performing a method of automatic calibration of an adaptive illumination system, as implemented by the barcode reader of FIG. 1 and/or the scanning device of FIG. 2.

In examples, an imager may have predetermined or preset object detect illumination and scanning illumination intensity values. Being able to manual or automatically tune or calibrate the object detect and scanning illumination intensity values allows for higher efficiency scanning, reduced light pollution and eye irritation, and reduced overall system energy use. FIG. 4 is a flowchart for performing a method of automatic calibration of an adaptive illumination system, as implemented by the barcode reader 106 of FIG. 1 and/or the scanning device 200 of FIG. 2.

A process 400 begins at block 402 with causing the adaptive illumination system to enter a calibration mode. To cause the system to enter a calibration mode, a user may present a barcode to an imager of the system, the system may decode the barcode and then cause the adaptive illumination system to enter the calibration mode. Further, a user may cause the system to enter the calibration mode via a user interface such as a keyboard, touch screen, or other user input device. The system may be configured to perform calibration periodically every few hours, or days, or on start up or after a specified number of scans performed. In the calibration mode, the illumination source of the adaptive illumination system provides a calibration illumination level to an environment including FOV of an imager. The calibration illumination level may depend on an ambient illumination of the environment. For example, in environments with very low light the calibration illumination may provide substantial light to image an object in the FOV of the imager. In brighter environments the illumination source may be substantially or entirely blocked or powered off to provide little to no light as the calibration illumination to the FOV of the imager.

An imaging sensor of the imager then captures one or more first image frames of the FOV of the environment. (block 404). The processor 116 then performs processing on the one or more first frames and determines a first illumination intensity. (block 406). In examples, the one or more frames includes a plurality of image frames of the environment and the processor determines an averaged image frame from the plurality of image frames. The processor then determines the first illumination intensity from the averaged image frame. The first illumination intensity is an illumination intensity that provides sufficient light to the environment for the imager to take an image of the environment and for the processor to determine, from the image, if an object is present in the environment or not. Therefore, the first illumination intensity may also be referred to herein as an object detect illumination level or illumination intensity.

The first illumination intensity may be provided by the illumination source while the system is in an object detect mode. The object detect mode is a configuration with the system components configured to determine the presence of an object, and upon determining the presence of the object, the system enters a scanning or read mode. The object detect mode may disable certain components such as decoding electronics, or alter settings of components, such as reduced image capture frame rate, or altered illumination to perform object detection in the environment. In examples, the first illumination may have an intensity that is lower than a scan illumination intensity, also referred to as a second illumination intensity, provided by the illumination source while the system is in the scanning mode. For example, in low ambient light environments, the first illumination intensity may be greater than the ambient environment light or illumination, but less intense than a scanning illumination provided by the illumination system 215. The first illumination intensity is a substantially minimum illumination intensity that is sufficient for detecting the presence of an object in the environment. For example, the first illumination intensity may provide enough illumination to capture and image with enough illumination to determine that a change has occurred (e.g., an object has entered the FOV) between two different images. In examples, the first illumination may be a minimum illumination that provides no illumination if ambient light in the environment provides enough illumination to perform object detection.

While described, for clarity and simplicity, as determining a single first illumination intensity, the processor may further determine maximum and minimum first illumination intensities for performing object detection. For example, the processor may determine a range of potential first illumination intensities from the determined first illumination intensity. The illumination source then provides illumination over the range of illumination levels to the environment and the imager captures a plurality of image frames with each image frame captured at a different illumination level. The processor then processes the image frames and determines a minimum and a maximum first illumination intensity (i.e., object detect illumination) from the captured image frames.

The processor 116 stores the first illumination intensity in a memory or other computer readable storage media. (block 408). The processor then configures, or otherwise controls, the illumination source to provide the first illumination intensity while the adaptive illumination system is in the object detect mode, and to provide the second illumination, or scanning illumination, while the system is in the scanning mode. (block 410). The sensor gain value may be determined as one or more gain values at which one or more frames of the one or more first frames has a signal-to-noise ratio (SNR) above a minimum predetermined threshold. Additionally, the first illumination intensity may be further determined from the sensor gain value instead of from, or in addition to, the one or more first frames.

In examples, the adaptive illumination system may also determine a sensor gain value for the image sensor from the one or more first frames. (block 420). The sensor gain value may be determined from a frame that captures only the ambient light of the environments, or the sensor gain value may be determined from a frame of the environment that is illuminated by the calibration illumination. In examples, the adaptive illumination system may determine a range of acceptable gain values with at least one of the acceptable gain values being a gain value at which an image is obtained that may be used for performing an object detection.

Figure 5:
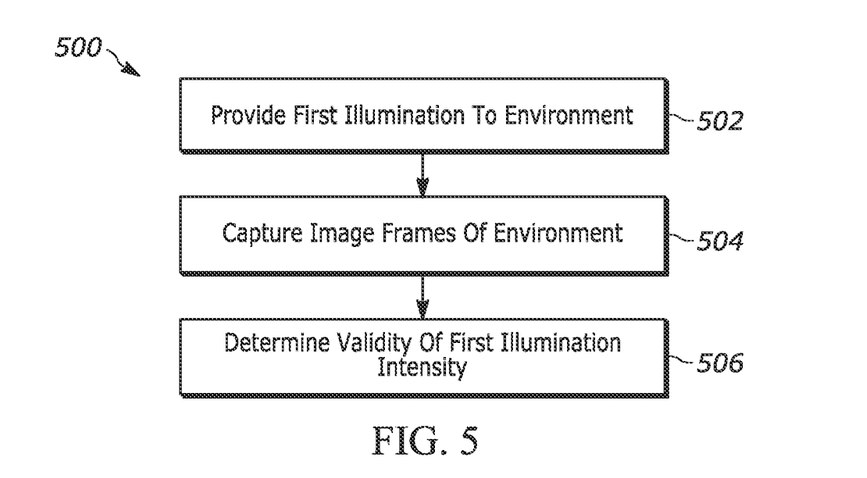
FIG. 5 illustrates a flowchart for performing a method of validating a first illumination intensity, such as the first illumination intensity determined by the method of FIG. 4.

FIG. 5 illustrates a flowchart for performing a method of validating a first illumination intensity, such as the first illumination intensity determined by the method of FIG. 4. A process 500 begins at block 502 with the illumination source providing illumination according to the determined first illumination intensity. The imaging sensor captures one or more second image frames of the environment with the first illumination provided to the environment (block 504). The processor 116 then processes the one or more second image frames and determines whether the first illumination intensity is validated. For example, the processor determines that the first illumination is validated if it is determined that a change has occurred between the one or more first image frames and the one or more second image frames, (e.g., that an object has entered the FOV).

Figure 6:
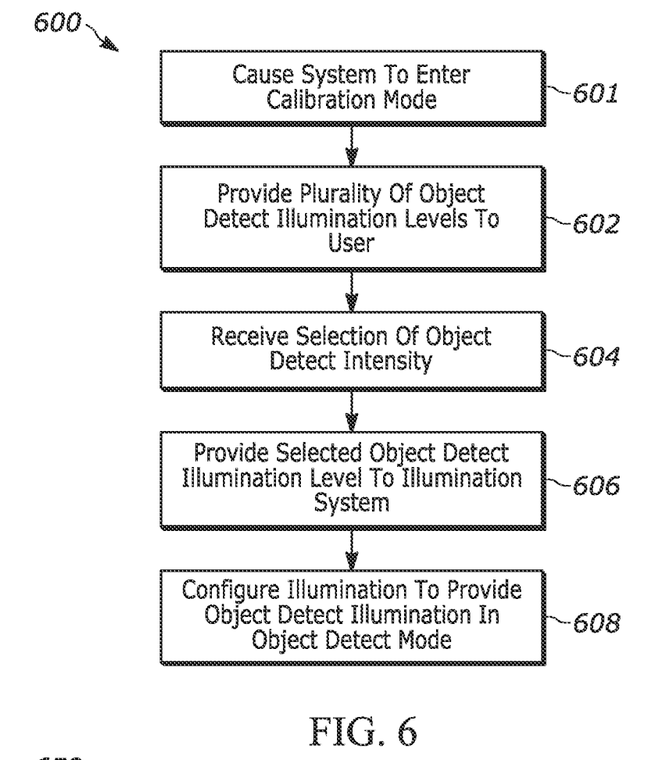
FIG. 6 illustrates a flowchart for performing another method of tuning illumination of an adaptive illumination system such as implemented by the barcode reader of FIG. 1 and/or the scanning device 200 of FIG. 2.

FIG. 6 illustrates a flowchart for performing a method of tuning illumination of an adaptive illumination system such as implemented by the barcode reader 106 of FIG. 1 and/or the scanning device 200 of FIG. 2. A process 600 begins at block 601 with causing the adaptive illumination system to enter a calibration mode. A user may provide a barcode to an imager to cause the system to enter the calibration mode, or a user may provide input to a terminal or user interface to cause the system to enter the calibration mode. The process continues at block 602 with presenting, to a user via a user interface, a plurality of first illumination intensities for performing object detection. The user interface may be a screen such as a touch screen, or another viewable medium for a user. The user interface may include a keyboard, mouse, or other input device for a user to provide the adaptive illumination system with a command or choice. The user inputs a selection of a desired object detect illumination level from the plurality of first illumination intensities and the system receives the user selection. (block 604).

A processor then provides the selected object detect illumination level to the adaptive illumination system. (block 606). The adaptive illumination system, or the processor, then configures an illumination source of the adaptive illumination system to provide illumination at the selected object detection illumination level while the adaptive illumination system is in an object detect mode, and provide illumination at a scanning illumination level while the adaptive illumination system is in a scanning mode. (block 608). The object detect illumination level at an intensity sufficient for detecting a presence of an object in the dormant mode and the object detect illumination level being less than the intensity of the scanning illumination level.

Figure 7:
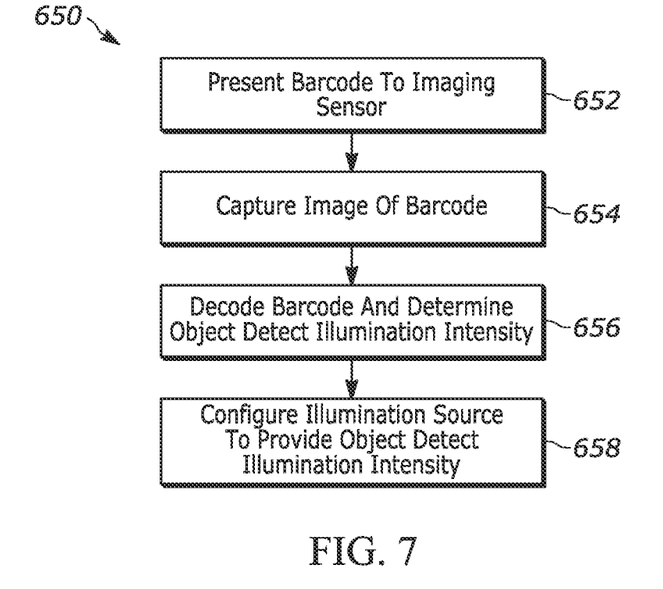
FIG. 7 illustrates a flowchart for performing a yet another method of tuning illumination of an adaptive illumination system such as implemented by the barcode reader of FIG. 1 and/or the scanning device of FIG. 2.

FIG. 7 illustrates a flowchart for performing a method of tuning illumination of an adaptive illumination system such as implemented by the barcode reader 106 of FIG. 1 and/or the scanning device 200 of FIG. 2. A process 650 begins at block 652 by presenting a barcode to an imaging sensor of the adaptive illumination system. The imaging sensor then captures an image of the barcode. (block 654). A processor decodes the barcode from the image, and the processor determines a first illumination intensity being an object detect illumination intensity, from the barcode. (block 656). The processor then configures an illumination source of the adaptive illumination system to provide illumination at the first illumination intensity while the adaptive illumination system is in an object detect mode, and provide illumination at a second illumination intensity, being a scanning illumination intensity, while the adaptive illumination system is in a scanning mode, the first illumination intensity being less than the intensity of the second illumination intensity. (block 658).

Figure 8:
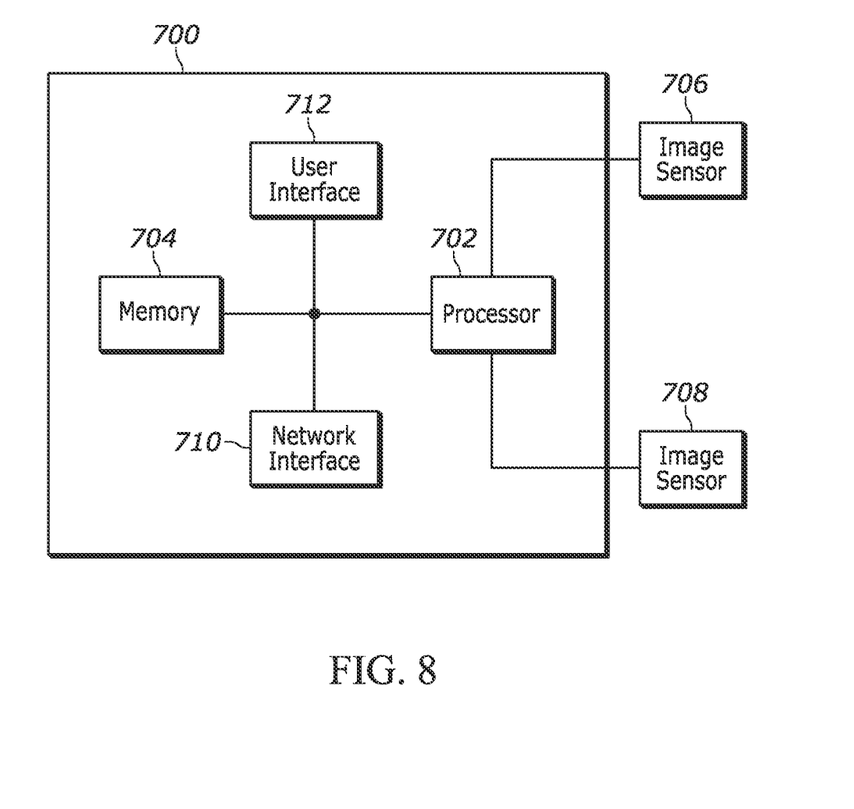
FIG. 8 illustrates an example processor platform coupled to a first image sensor and a second image sensor that can be used to implement the teachings of this disclosure.

FIG. 8 is a block diagram representative of an example processor platform 700 capable of implementing, for example, one or more components of the example systems for scanning multiple items in a single swipe. The processor platform 700 includes a processor 702 and memory 704. In the example shown, the processor is coupled to a first image sensor 706 and a second image sensor 708. The processor platform 700 and/or one or more of the image sensors 706, 708 may be used to implement the system 100 of FIG. 1 and/or the scanning device 200 of FIG. 2.

The memory capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The memory (e.g., volatile memory, non-volatile memory) 704 accessible by the processor 702 (e.g., via a memory controller). The example processor 702 interacts with the memory 704 to obtain, for example, machine-readable instructions stored in the memory 704 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 700 to provide access to the machine-readable instructions stored thereon.

The example processing platform 700 of FIG. 8 also includes a network interface 710 to enable communication with other machines via, for example, one or more networks. The example network interface 710 includes any suitable type of communication interface(s) (e.g., wired and/or wireless interfaces) configured to operate in accordance with any suitable protocol(s).

The example processing platform 700 of FIG. 8 further includes a user interface 712 to enable providing outputs to a user, and to receive inputs from a user. The example user interface 712 may include one or more monitors, touch screens, mobile devices, or other display devices. The user interface 712 may also include input devices and means such as a touch screen, keyboard, mouse, dials, voice control devices, or other input devices and hardware.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in anyway. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method of calibrating an adaptive illumination system of an imager, the adaptive illumination system having an illumination source, the method comprising:
   causing the adaptive illumination system to enter a calibration mode in which the illumination source of the adaptive illumination system provides a calibration illumination level to an environment;
   capturing, by an imaging sensor of the imager, one or more first frames of the environment;
   determining, by a processor and from the one or more first frames, a first illumination intensity for the illumination source, the first illumination intensity having an illumination intensity sufficient for detecting a presence of an object in the environment in an object detection mode of the reader, and less intensity than a second illumination intensity for illuminating the object in the environment during a scanning mode of the reader;
   storing, by the processor, the determined first illumination intensity in a memory; and
   configuring, by the processor, the illumination source of the adaptive illumination system to (i) provide illumination at the first illumination intensity while the adaptive illumination system is in the object detect mode, and (ii) provide illumination at the second illumination intensity while the adaptive illumination system is in the scanning mode.

2. The method of claim 1, wherein causing the system to enter a calibration mode comprises presenting a calibration barcode to the imaging sensor of the adaptive illumination system.

3. The method of claim 1, further comprising determining, by the processor and from the one or more first image frames, a sensor gain value for the imaging sensor.

4. The method of claim 3, wherein the sensor gain value is a value at which at least one of the one or more frames has a SNR above a minimum threshold.

5. The method of claim 3, wherein the sensor gain value comprises a range of acceptable sensor gain values, wherein the range of acceptable sensor gain values includes a gain value at which an object detection may be performed in an image.

6. The method of claim 3, wherein determining the first illumination intensity further comprises determining the first illumination intensity based on the sensor gain value.

7. The method of claim 1, further comprising:
wherein the one or more first frames comprise a plurality of frames; and
determining, by the processor, an averaged image frame from the plurality of frames; and wherein determining a first illumination intensity comprises determining, by the processor, the first illumination intensity from the averaged image frame.

8. The method of claim 1, further comprising:
providing, by the illumination source, illumination according to the determined first illumination intensity;
capturing, by the imaging sensor, one or more second frames; and
validating, by the processor, the determined first illumination intensity based on the one or more second frames.

9. The method of claim 1, further comprising:
determining, by the processor and from the first illumination intensity, a range of illumination levels;
providing, by the illumination source, illumination over the range of illumination levels;
capturing, by the imaging sensor, a plurality of image frames at different illumination levels; and
determining, by the processor, a minimum and maximum object detect illumination level from the plurality of image frames.

10. The method of claim 1, wherein the first illumination intensity is a substantially minimum illumination intensity that is sufficient for detecting the presence of an object in the environment.

11. The method of claim 1, wherein the calibration illumination level is an illumination level that provides no illumination to the environment.

12. An adaptive illumination device comprising:
an adaptive illumination source disposed to provide illumination to an environment, the adaptive illumination source capable of providing variable intensities of illumination to the environment including providing (i) a calibration illumination level to an environment, the calibration illumination intensity level determined from ambient illumination of the environment, (ii) a first illumination intensity sufficient for illuminating an object in the environment for an imager to detect the object in the environment, and (iii) a second illumination intensity sufficient for performing scanning of indicia associated with the object in the environment.

13. An adaptive illumination imaging system comprising:
an illumination source disposed to provide illumination to an environment, the illumination source capable of providing variable illumination intensities to the environment;
an imaging sensor disposed capture a frame of the environment and to generate an electrical signal indicative of the frame;
a processor and computer-readable media storing machine readable instructions that, when executed, cause the adaptive illumination imaging system to:
causing the adaptive illumination system to enter a calibration mode in which the illumination source of the adaptive illumination system provides a calibration illumination level to an environment;
capture, by the imaging sensor, one or more first frames of the environment;
determine, by the processor and from the one or more first frames, a first illumination intensity for the illumination source, the first illumination intensity having an illumination intensity sufficient for detecting a presence of an object in the environment in an object detection mode of the reader, and less intensity than a second illumination intensity for illuminating the object in the environment during a scanning mode of the reader;
store, by the processor, the determined first illumination intensity in a memory; and
configure, by the processor, the illumination source (i) provide illumination at the first illumination intensity while the adaptive illumination system is in the object detect mode, and (ii) provide illumination at the second illumination intensity while the adaptive illumination system is in the scanning mode.

14. The adaptive illumination imaging system of claim 13, wherein the calibration illumination level is an illumination level that provides no illumination to the environment.

15. The adaptive illumination imaging system of claim 13, wherein the first illumination intensity is a substantially minimum illumination intensity that is sufficient for detecting the presence of an object in the environment.

16. The adaptive illumination imaging system of claim 13, wherein the one or more first frames comprise a plurality of frames, and wherein the machine readable instructions further cause the adaptive illumination imaging system to determine, by the processor, an averaged image frame from the plurality of frames, and wherein to determine a first illumination intensity, the processor determine the first illumination intensity from the averaged image frame.

17. The adaptive illumination imaging system of claim 13, wherein the machine readable instructions further cause the adaptive illumination imaging system to determine, by the processor, a sensor gain value of the imaging sensor from the one or more first frames.

18. The adaptive illumination imaging system of claim 17, wherein to determine the first illumination intensity, the machine readable instructions further cause the adaptive illumination system to determine, by the processor, the first illumination intensity based on the sensor gain value.

* * * * *